Dec. 11, 1951  H. G. HUGHEY  2,578,065
APPARATUS FOR FLAME HARDENING ROUNDS
Filed March 27, 1948  2 SHEETS—SHEET 2
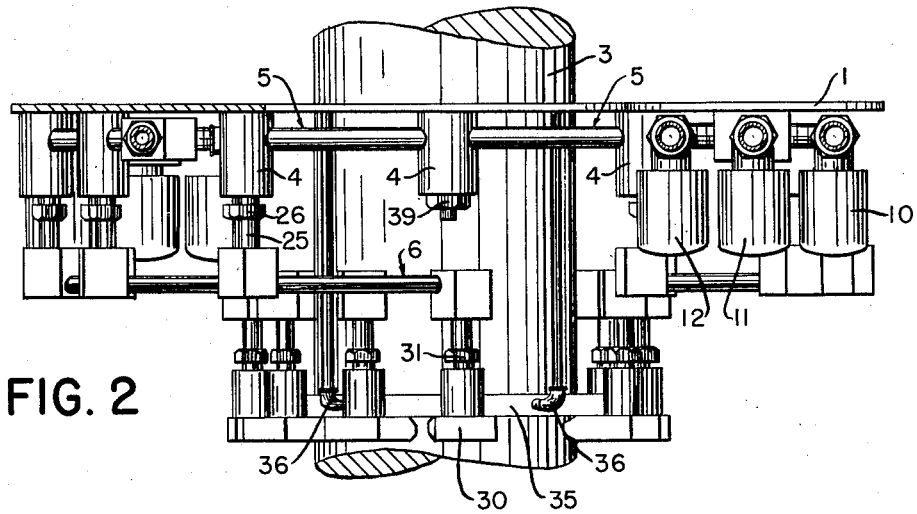
FIG. 2
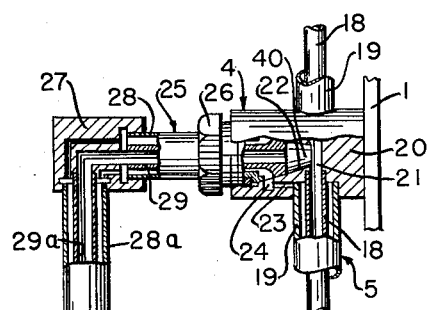
FIG. 3
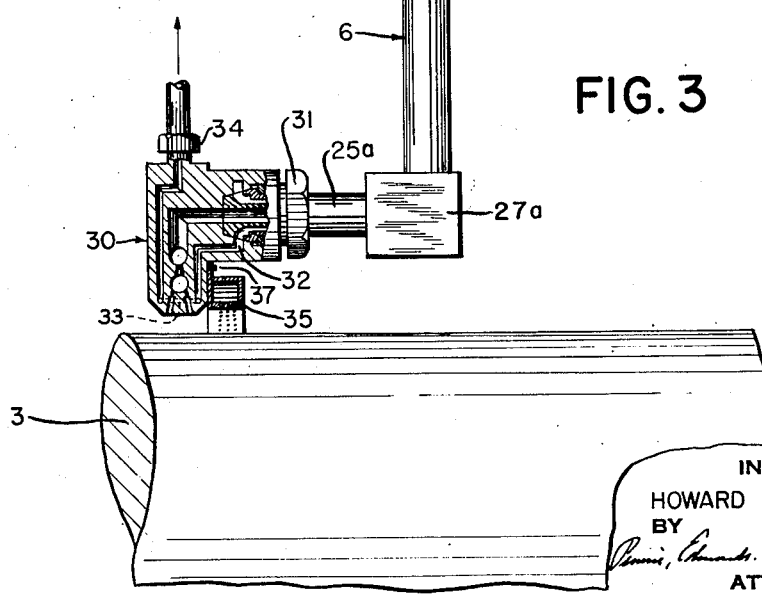
INVENTOR
HOWARD G. HUGHEY
BY
ATTORNEYS Patented Dec. 11, 1951

2,578,065

UNITED STATES PATENT OFFICE 2,578,065

APPARATUS FOR FLAME HARDENING ROUNDS

Howard G. Hughey, Fanwood, N. J., assignor to Air Reduction Company, Incorporated, New York, N. Y., a corporation of New York Application March 27, 1948, Serial No. 17,445

3 Claims. (Cl. 266—4)

This invention relates to apparatus for flame hardening a surface of a cylindrical body. Such bodies are frequently referred to in the art as "rounds."

It is often desired to surface-harden materials such as cast iron, steel, and the like, by heating the portion of the material to be hardened with heating flames, for example, oxy-acetylene flames, to its critical temperature and immediately cooling it rapidly by quenching with a direct application of water jets. The apparatus of the present invention is adapted to surface-harden cylindrical metal bodies or work-pieces in that manner, and is characterized in being adapted to surface-harden work-pieces embracing a considerable range of diameters. To this end, the torch tips from which the heating flames are projected against the work-piece are supported on a series of supporting arms so swiveled that the torch tips accommodate work pieces of various diameters and can be spaced one from the other so as to heat uniformly the surface to be hardened. The rapid quenching which hardens the metal is, in accordance with this invention, effected by means of water jets from a quench ring selected as to size so that it will surround the cylindrical surface of the body or work-piece, this ring being supported in fixed spacial relation to the torch tips.

The invention will be more clearly understood by reference to the accompanying drawings, wherein:

Fig. 2 is a plan or top view of the apparatus of Fig. 1, showing a portion of the work-piece in operative relation to the apparatus; and Fig. 3 is an enlarged detail view of a torch tip and supporting arm assembly shown partly in section.

Figure 1:
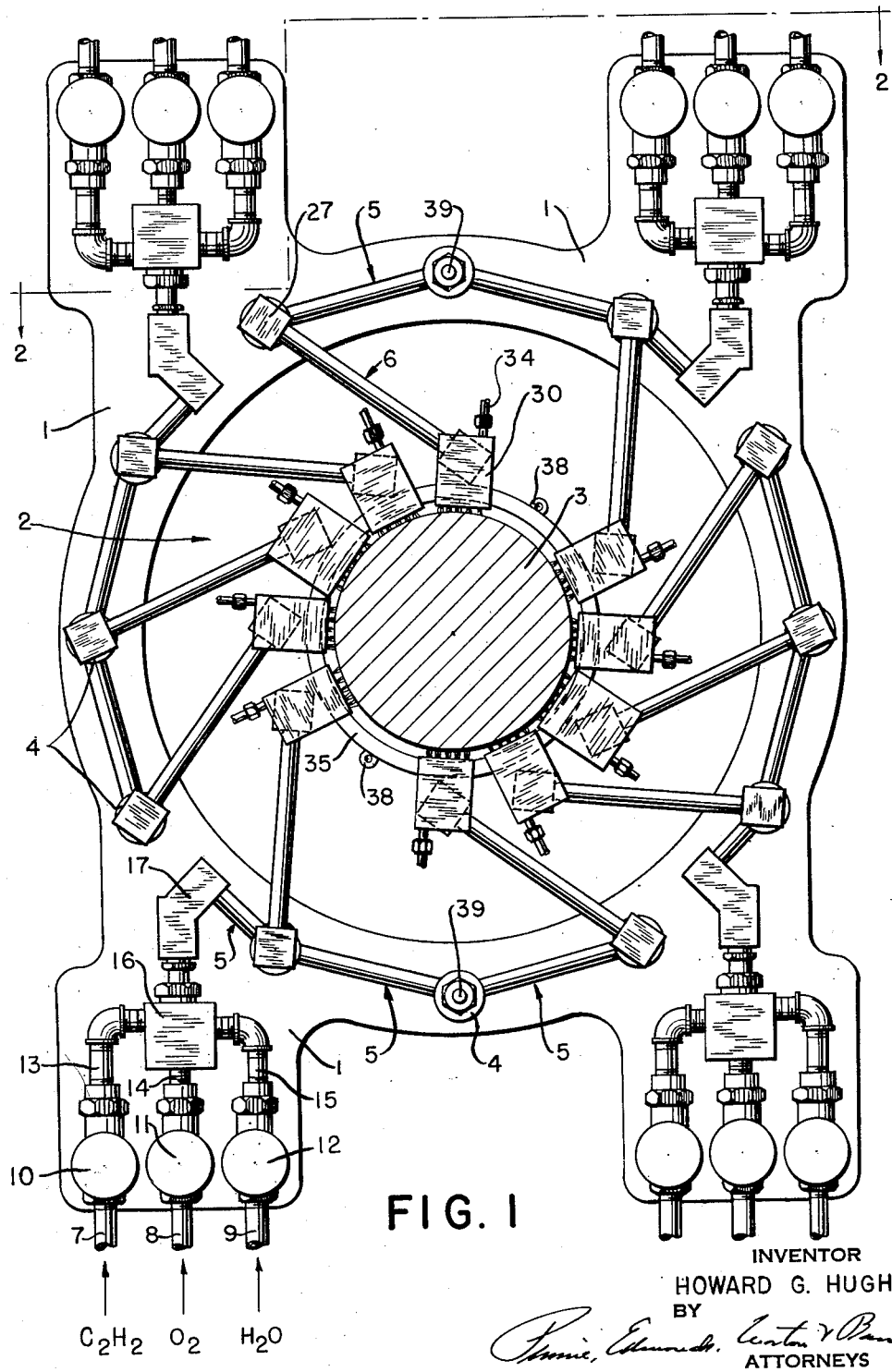
Fig. 1 is an elevational view of the apparatus in operative position about a work-piece which is shown in transverse section.

Referring to the drawings, a base plate 1 of generally annular form, having a central opening 2 of larger diameter than that of the largest work-piece to be accommodated in the apparatus, is suitably supported in operating relation to the cylindrical work-piece 3 to be heat treated or hardened. In the drawings, the work-piece may be assumed to be a steel shaft which has been inserted in the apparatus for the purpose of being surface-hardened, and the entire apparatus is so mounted that the work-piece may be supported with its longitudinal axis horizontal and so that the work-piece may be rotated about its horizontal axis to assure uniform heating. It is also assumed that the work-piece and the hardening apparatus are suitably moved longitudinally with respect to each other so that the entire surface of the work may be progressively hardened. It is convenient to employ a lathe to support and rotate the work-piece, the flame hardening unit being arranged to move automatically along the bed of the lathe in order to treat the entire surface of the work-piece. It should be understood, however, that if desired, the apparatus may be mounted so that the work-piece will be in a vertical position while it is being heat-treated.

A series of receptacles 4 are spaced apart around the opening 2 in the base plate 1 and preferably are secured to the base plate. Passing through the receptacles are four manifolds 5 which distribute the gas to torch tip supporting arms 6. In accordance with the preferred embodiment of the invention the manifolds 5 comprise concentric conduits carrying both gas and cooling water for the torch tips, and each of these conduits is connected to suitable gas and water passages, respectively, within the receptacles, as will be explained below.

Attached to the base plate 1 are fittings for the gas and water supply lines, gas mixers, and valves to control the flow of gas and water. Although the heating flames may be produced by any suitable combustible gas mixture, it may be assumed that such mixture comprises acetylene and oxygen, these gases being hereinafter referred to for illustrative purposes. Thus, pipe 7 supplies acetylene, pipe 8 supplies oxygen, and pipe 9 supplies cooling water for the torch tips. The quenching water which is supplied to the quench ring is separately provided, because the volume of water required for quenching is greater than can be conveniently accommodated in the torch tip supporting arms. Also, the quench water temperature should be independent of the torches. Each supply line is fitted with a control valve which conveniently may comprise remotely controlled electric solenoid valves 10, 11, and 12 which control the acetylene, oxygen and water, respectively. Leading from these valves are conduits 13, 14 and 15 connecting to a union 16 which operates as a mixing chamber for the oxygen and acetylene. The water passes in a separate pipe or conduit through the chamber 16 to communicate with a water conduit within the manifold 5 (Fig. 3). The mixed gases and the water are fed into the manifold 5 through a suitable duplex fitting 17 (Fig. 1).

Referring to Fig. 3 each distributing manifold 5 comprises an inner tube 18 which carries the mixed gas and an outer concentric tube 19 which carries the cooling water. Each of the four distributing manifolds illustrated in Fig. 1 is adapted to supply three torch tips, but any desired number of torch tips may be connected to a manifold. Also, the number of manifolds employed may vary from one to as many as required. It will be evident that if all of the torch tips are fed from the same manifold the required size of the manifold may become excessive in order to provide sufficient volumes and pressures of gas and water.

The construction of the receptacles 4 to which the manifolds are connected, and in which the torch tip supporting arms 6 are swiveled, is illustrated in Fig. 3. It will be seen that the concentric tubes 18 and 19 terminate in a block 20 which is suitably secured to the base plate 1 as by welding. A passage 21 is drilled through the block 20 to carry the mixed gases from tube 18 through the block to a similar manifold tube on the other side thereof. A swivel channel 40 terminating in a conical seating surface 22 is machined in the block from the end opposite the base 1, the swivel channel being of sufficient depth to communicate with the passage 21 carrying the mixed gases. The cooling water which is carried by the concentric outer tube 19 of the manifold 5 is conducted by passage 23 to a slot 24 around the upper portion of the conical seat 22. Another passage (not shown) similar to passage 23 connects the cooling water manifold on the other side of the block with slot 24. A connecting duplex pipe member 25 is composed of two concentric tubes 28 and 29. The inner tube 29 communicates through swivel channel 40 with tube 18 and the outer tube 28 communicates through swivel channel 24 with tube 19. The lower end of tube 29 (as seen in the drawing) constitutes one end of the tip supporting arm 6, and carries at the extremity thereof a conical seating surface which meets with that of surface 22. In the cylindrical portion of the mentioned recess are cut threads into which a locking nut 26 can be screwed so as to urge together the conical surface 22 of the stationary receptacle and the contiguous movable mating surface of the end of the arm. These members form a swivel joint. By sufficiently tightening nut 26 the swivel joint can be locked in any desired position, thus permitting fixed angular adjustment of arm 6.

A suitable elbow 27 carries the gas and water flowing in tubes 28 and 29 into a portion of the tip supporting arm 6 composed of concentric tubes 28a and 29a. These tubes are similar to tubes 28 and 29. Another elbow 27a and connecting pipe member 25a, which are similar to elbow 27 and pipe 25, complete the bent- or Z-shape supporting arm.

A torch tip 30 of multi-flame block type construction is swiveled on the other end of the arm 6 by fittings corresponding to those comprising the swivel in receptacle 4. As before, a locking nut 31 is provided, which, if loosened slightly, will permit the tip 30 to be swiveled to any desired angle on the end of arm 6. By tightening nut 31 the selected adjusted position will be fixed. As may be expected, it is necessary to renew the torch tips at intervals, or to change the sizes thereof, and the illustrated construction permits the ready replacement of each torch tip merely by unscrewing tip locking nut 31.

The torch tip illustrated in Fig. 3 is of the water cooled type. Water passage 32 which communicates with the water duct between the outer tube 28 and inner tube 29 of the arm 6 carries water to the cooling passage 33 near the orifices of the torch tip. The heated water flows out of the tip through the exhaust fitting 34.

The quench ring 35 which, in the particular machine illustrated is of approximately square cross-section, is adapted to project a multitude of quench water jets from orifices in its inner cylindrical surface. Since the ring should bear a fixed relation to the torch tips, it is conveniently supported at least in part on the torch tips themselves or on a suitable number of them. Water in sufficient volume is fed to the quench ring by means of water supply pipes 36 (Fig. 2) spaced around the ring and connected to a suitable supply. If these pipes are of rigid construction they also may serve as supports for the quench ring. A pin 37 (Fig. 3) on each torch tip fits into a corresponding eye 38 (Fig. 1) in an appropriate bracket secured to the quench ring, thus to align the ring and tips and to provide the required predetermined spacial relation between the tip, the ring and the work.

By having the quench ring secured against the sides of the torch tips closest the supporting arms, the water passing through the quench ring absorbs heat from the torch tips and assists in keeping them cool. Also, the water which is directed from the quench ring against the work-piece acts as a barrier to protect the supporting arm 6 and the connections 25a between them and the torch tips from the heat of the flames from the torch tips.

From the foregoing description it will be evident that since the tip arms are swiveled in their receptacles, their inner ends can be swung toward and away from the work-piece, and that since the torch tips are swiveled on the supporting arms they can be angularly adjusted thereon. This construction permits the tips to be properly spaced with respect to each other and with respect to the surface of the work-piece for a large range of sizes of work-pieces. The change in adjustment of the tip arms necessary to accommodate work-pieces of different sizes corresponds roughly to the movement of the leaves in the iris of a camera diaphragm to effect a change in aperture.

When work-pieces of extremely small diameters are to be hardened, and a lesser number of tips are required to fit around the work in correct heating position, alternate tip arms can be removed at the tip arm receptacles. In this event, plugs 39 (Figs. 1 and 2) are inserted in the receptacles from which the tip arms are removed to prevent the escape of gas and water.

Although quench rings formed in sectors can be employed, it is usually more satisfactory to use quench rings formed as a continuous ring, as illustrated herein, in which event it is necessary to select a ring of correct diameter to accommodate a work-piece of given diameter. In fact, a convenient method by which to adjust the torch tips is first to select a quench ring of the correct diameter to fit the work and then to place the pins 37 located near the ends of the torch tips, into the respective eyes 38 suitably spaced around the ring. This automatically results in the correct spacial relation of the tips, the quench ring and the work and also provides a guide to the workman as to the number of tips required for the work at hand, because only as many tips will be used as there are eyes in the ring to accommodate the pins on the tips.

What is claimed is:

1. In apparatus for flame hardening a cylindrical surface of a metal body, a base member adapted to at least partially surround the metal body in spaced relation thereto, a series of torch tip supporting arms swiveled at their outer ends to said base member at a number of points spaced circumferentially of the metal body and adapted to project inwardly toward the metal body and tangentially thereof, a liquid cooled torch tip having a row of gas discharge passages arranged to extend in a direction transversely of the longitudinal direction of the workpiece and swiveled to the inner end of each tip supporting arm so that regardless of the angle at which the arms project inwardly from the base member the tips can be adjusted so that their discharge passages will cause the heating flames to be directed substantially normal to the surface of the cylindrical work-piece, and means for supplying gas and a cooling liquid to the torch tips including a gas passage and an independent cooling liquid passage extending through each tip supporting arm and through its swivel connection to said base member and also through its swivel connection to its torch tip.

2. In an apparatus for flame hardening a cylindrical surface of a metal body, gas distributing manifold means shaped to surround at least a part of said surface, a plurality of receptacles spaced along said manifold means, a plurality of torch-tip-supporting arms having their outer ends pivotally supported in said receptacles and adapted to project inwardly toward the metal body and generally tangentially thereof, a torch tip supported from the inner end of each arm and off-set from said arm in a direction longitudinally of said metal body, swivel means interposed between the inner end of each arm and the torch tip supported thereby, whereby the angle of each tip may be adjusted with respect to the surface of the body, a gas passage in each receptacle communicating with said manifold means, a gas duct communicating with said passage and passing through said receptacle, said arm, said swivel means and said tip, said gas duct being effectively continuous at all adjusted positions of said tip, a quench ring surrounding said body and from which quenching water flows to the cylindrical surface of said body, and a water connection to said quench ring, said quench ring being attached to said torch tips and being positioned in a direction longitudinally of said metal body intermediate said torch tips and said torch-tip supporting arms, whereby water flowing from the quench ring acts as a barrier to protect the torch-tip supporting arms from the heat of the flames from the torch tips.

3. In an apparatus for flame hardening a cylindrical surface of a metal body, gas and water distributing manifold means shaped to surround at least a part of said surface, a plurality of receptacles spaced along said manifold means, a plurality of torch-tip supporting arms having their outer ends pivotally supported in said receptacles and adapted to project inwardly toward the metal body and generally tangentially thereof, a torch tip supported from the inner end of each arm and offset from said arm in a direction longitudinally of said metal body, swivel means interposed between the inner end of each arm and the torch tip supported thereby, whereby the angle of each tip may be adjusted with respect to the surface of the body, a gas passage in each receptacle communicating with said manifold means, a gas duct communicating with said passage and passing through said receptacle, said arm, said swivel means and said tip, said gas duct being effectively continuous at all adjusted positions of said tip, a water passage in each receptacle communicating with said manifold means, a water duct communicating with said passage and passing through said receptacle, said arm, said swivel means and said tip, said water duct being effectively continuous at all adjusted positions of said tip, said water duct surrounding said gas duct, a quench ring proportioned to surround said body and from which quenching water flows to the cylindrical surface of said body, and a water connection to said quench ring, said quench ring being attached to said torch tips and being positioned in a direction longitudinally of said metal body intermediate said torch tips and said torch-tip supporting arms, whereby water flowing from the quench ring acts as a barrier to protect the torch-tip supporting arms from the heat of the flames from the torch tips.

HOWARD G. HUGHEY.

REFERENCES CITED

The following references are of record in the file of this patent:

UNITED STATES PATENTS

| Number | Name | Date |
|---|---|---|
| 2,031,583 | Anderson | Feb. 25, 1936 |
| 2,124,459 | Burgess | July 19, 1938 |
| 2,188,637 | Walker | Jan. 30, 1940 |
| 2,273,809 | Kinzel | Feb. 17, 1942 |
| 2,367,898 | Spieth | Jan. 23, 1945 |
| 2,387,835 | Day et al. | Oct. 30, 1945 |
| 2,407,230 | Furkert | Sept. 10, 1946 |

FOREIGN PATENTS

| Number | Country | Date |
|---|---|---|
| 5,893 | Great Britain | Aug. 1, 1891 |
| 441,329 | Great Britain | Jan. 17, 1936 |
| 232,264 | Germany | Mar. 10, 1911 |